US010484578B2

(12) United States Patent
Berube et al.

(10) Patent No.: US 10,484,578 B2
(45) Date of Patent: Nov. 19, 2019

(54) SYNCHRONIZING VIDEO OUTPUTS TOWARDS A SINGLE DISPLAY FREQUENCY

(71) Applicant: CAE Inc., Saint-Laurent (CA)

(72) Inventors: Samuel Berube, Saint-Laurent (CA); Jean-Sébastien Dion, Montréal (CA)

(73) Assignee: CAE Inc., St-Laurent, QC (CA)

( * ) Notice: Subject to any disclaimer, the term of this patent is extended or adjusted under 35 U.S.C. 154(b) by 0 days.

(21) Appl. No.: 15/941,929

(22) Filed: Mar. 30, 2018

(65) Prior Publication Data

US 2019/0306381 A1   Oct. 3, 2019

(51) Int. Cl.
*H04N 5/067* (2006.01)
*H04N 5/06* (2006.01)

(52) U.S. Cl.
CPC .................................. *H04N 5/067* (2013.01)

(58) Field of Classification Search
CPC ...................................................... H04N 5/067
See application file for complete search history.

(56) References Cited

U.S. PATENT DOCUMENTS

| 5,155,595 | A | 10/1992 | Robinson |
| 8,891,014 | B2 | 11/2014 | Derer |
| 9,036,084 | B2 | 5/2015 | Law et al. |
| 9,122,443 | B1 | 9/2015 | Lamborn et al. |
| 9,348,355 | B2 | 5/2016 | Glen et al. |
| 2008/0268961 | A1 | 10/2008 | Brook et al. |
| 2015/0189012 | A1 | 7/2015 | Jadhav et al. |
| 2015/0340009 | A1 | 11/2015 | Loeffler et al. |
| 2016/0357493 | A1* | 12/2016 | Zerwas ................. G06F 3/1438 |
| 2017/0053610 | A1 | 2/2017 | Yang et al. |

FOREIGN PATENT DOCUMENTS

| KR | 101419921 B1 | 7/2014 |
| WO | 2010145773 | 12/2010 |
| WO | 2016151291 | 9/2016 |

* cited by examiner

*Primary Examiner* — Jefferey F Harold
*Assistant Examiner* — Justin B Sanders
(74) *Attorney, Agent, or Firm* — Gowling WLG (Canada) LLP; Benoit Yelle (57) ABSTRACT

Method and system for synchronizing video output towards a single display frequency comprising providing a shared reference signal for synchronizing, at the single display frequency, video output between two or more image generator processors each driving at least one independent video card. Each of the video cards supports on-the-fly image refresh rate adaptation based on responsiveness from the corresponding image generator processor. The method also comprises, at each one of the image generator processors, artificially affecting, in real-time, image generation rendering speed during a next frame generation processing to trigger the on-the-fly image refresh rate adaptation by the one image generator processor's video card for proactively scheduling refresh of an image corresponding to the next frame by the one image generator processor's video card, thereby aligning the refresh of the image to the shared reference signal while avoiding manipulation of video card's memory registers by the one image generator processor.

20 Claims, 3 Drawing Sheets

SYNCHRONIZING VIDEO OUTPUTS TOWARDS A SINGLE DISPLAY FREQUENCY

TECHNICAL FIELD

The present invention relates to video cards' output synchronization and, more particularly, to software-controlled video cards' output synchronization.

BACKGROUND

It is sometimes required to concurrently display images from different sources. For instance, when projecting images from different projectors on a single screen, synchronizing the projectors avoids creation of visual artefacts. Likewise, different signals provided to a single projector or display screen are synchronized to be correctly displayed together. Synchronizing signals from different sources, however, typically requires complicated solutions mostly based on dedicated hardware components.

The present invention aims at simplifying synchronization of images from different sources.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of is directed to a method for synchronizing video output towards a single display frequency comprising providing a shared reference signal for synchronizing, at the single display frequency, video output between two or more image generator processors each driving at least one independent video card. Each of the independent video cards supports on-the-fly image refresh rate adaptation based on responsiveness from the corresponding image generator processor. The method also comprises, at each one of the image generator processors, artificially affecting, in real-time, image generation rendering speed during a next frame generation processing to trigger the on-the-fly image refresh rate adaptation by the one image generator processor's video card for proactively scheduling refresh of an image corresponding to the next frame by the one image generator processor's video card, thereby aligning the refresh of the image to the shared reference signal while avoiding manipulation of video card's memory registers by the one image generator processor.

In some embodiments, artificially affecting, in real-time, image generation rendering speed is performed by programmatically mimicking, in real-time, image generation rendering lag during the next frame generation processing. In some embodiments, alternatively or in addition, artificially affecting, in real-time, image generation rendering speed is performed by programmatically mimicking, in real-time, image generation rendering hastening during the next frame generation processing.

When the one image generator processor is a master image generator processor, artificially affecting, in real-time, image generation rendering speed may optionally involve scheduling the next frame generation processing by a predetermined target timer linked to the shared reference signal while avoiding manipulation of the video card's memory registers by the master image generator processor.

When the one image generator processor is a slave image generator processor and unless the shared reference signal is aligned to a local slave signal, artificially affecting, in real-time, image generation rendering speed may optionally involve scheduling the next frame generation processing by varying a mimicked rendering timer in real-time during a next slave frame processing to trigger the on-the-fly image refresh rate adaptation by the slave image generator processor's video card for reducing a time distance between the shared reference and the local slave signal, thereby improving synchronicity of an image corresponding to the next slave frame and an image corresponding to another next frame from another of the two or more image generator processors while avoiding manipulation of the video card's memory registers by the slave image generator processor. In such an example, the method may further comprise sending, from the slave image generator processor towards a reference signal generator, an indication of the time distance between the slave local signal and the shared reference signal. The indication may optionally comprise the time distance between the shared reference and the local slave reference signal. In addition or alternatively, the reference signal generator may be provided by a master image generator processor from the two or more image generator processors. The method may also further comprise updating the shared reference signal by adjusting the predetermined target timer at the reference signal generator considering a plurality of received indications comprising the received indication of the time distance between the slave local signal and the shared reference signal. Adjusting the predetermined target timer may then optionally be performed by subtracting a minimum value from a plurality of received time distances from the plurality of received indications.

When the one image generator processor is the slave image generator processor and when the shared reference signal is aligned with the local slave reference signal, the method may then comprise processing the next frame without modifying the mimicked rendering timer.

In some embodiments, artificially affecting, in real-time, image generation rendering speed during the next frame generation processing may be performed by, when the one image generator processor is a slave image generator processor and when the shared reference signal is delayed compared to a local slave reference signal, increasing a mimicked rendering lag in real-time during a next slave frame processing to trigger the on-the-fly image refresh rate adaptation by the slave image generator processor's video card for reducing a time distance between the shared reference and the local slave reference signal, thereby improving synchronicity of an image corresponding to the next slave frame and the image corresponding to the next master frame.

In some embodiments, artificially affecting, in real-time, image generation rendering speed during the next frame generation processing is performed by, when the one image generator processor is the slave image generator processor and when the shared reference signal is in advance compared to the local slave reference signal, decreasing the mimicked rendering lag in real-time during the next slave frame processing for reducing the time distance between the shared reference signal and the local slave reference signal, thereby improving the synchronicity of the image corresponding to the next slave frame and the image corresponding to the next master frame.

The method may also comprise, independently from each of the two or more image generator processors, providing each of the images corresponding to each of the next frame at the single display frequency.

A second aspect is directed to a system comprising a display system for displaying a synchronized composite image thereon at a single display frequency, a plurality of independent video cards each supporting on-the-fly image refresh rate adaptation based on responsiveness from a corresponding image generator process and a plurality of image generator processors each driving one or more of the plurality of independent video cards and having access to a shared reference signal. Each one of the plurality of image generator processors artificially affects, in real-time, image generation rendering speed during a next frame generation processing to trigger the on-the-fly image refresh rate adaptation by the one image generator processor's video card for proactively scheduling refresh of an image corresponding to the next frame by the one image generator processor's video card, thereby aligning the refresh of the image to the shared reference signal while avoiding manipulation of video card's memory registers by the one image generator processor. The composite image comprises each of the images corresponding to the next frames from each one of the plurality of image generator processors.

The one image generator processor may artificially affect, in real-time, image generation rendering speed by programmatically mimicking, in real-time, image generation rendering lag during the next frame generation processing. The one image generator processor artificially may also, alternatively or additionally, affect, in real-time, image generation rendering speed by programmatically mimicking, in real-time, image generation rendering hastening during the next frame generation processing.

The plurality of image generator processors may comprise a master image generator processor and one or more slave image generator processor and, when the one image generator processor is the master image generator processor, the master image generator processor artificially may affect, in real-time, image generation rendering speed during the next frame generation processing by scheduling a next master frame generation processing by a predetermined target timer linked to the shared reference signal while avoiding manipulation of the video card's memory registers by the master image generator processor.

The plurality of image generator processors may also comprise one or more slave image generator processor and, when the one image generator processor is the slave image generator processor and unless the shared reference signal is aligned to a local slave signal, the slave image generator processor artificially affects, in real-time, image generation rendering speed during the next frame generation processing by varying a mimicked rendering timer in real-time during a next slave frame processing to trigger the on-the-fly image refresh rate adaptation by the slave image generator processor's video card for reducing a time distance between the shared reference and the local slave signal, thereby improving synchronicity of an image corresponding to the next slave frame and an image corresponding to another next frame from another of the plurality of image generator processors while avoiding manipulation of the video card's memory registers by the slave image generator processor. The slave image generator processor may further send, towards a reference signal generator, an indication of the time distance between the slave local signal and the shared reference signal. The indication may comprise the time distance between the shared reference and the local slave reference signal. The reference signal generator may update the shared reference signal by adjusting the predetermined target timer considering a plurality of received indications comprising the received indication of the time distance between the slave local signal and the shared reference signal.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Development of the different embodiments of the present invention has been triggered by the necessity, in the context of immersive interactive computer simulation, to concurrently display images from different sources on a single screen or using a single display panel. Some devices may take multiple video inputs and offers many options such as merging/adding them together, which may also require synchronization of the different inputs. More specifically, in the context of immersive interactive computer simulation, a large (single) display system is provided to one or more trainees in an interactive simulation station.

Still in the context of immersive interactive computer simulation, different computing machines, each equipped with one or more hardware video cards, are typically used to compute the images to be displayed on the display system. In order to avoid creation of visual artefacts, outputs from the video cards are synchronized. One solution is to affect the timing of the video signals from the video card by directly managing the timing of their video output. This was possible by manipulating certain internal memory registered housed on the video cards. However, video cards made today do not make their internal memory registers visible within the host computer. That is, only the software routines provided by the video card manufacturers have access to the internal memory registers. Such features ensure that the video card perform in accordance with the manufacturer's specifications and that only the best routines known to the manufacturers are used in managing the internal memory registered. At the same time, some video cards available today support on-the-fly image refresh rate adaptation based on responsiveness from the corresponding image generator processor. That is, the video card will dynamically adapt the video output refresh rate to best match the speed of the host computer that provides the images. Embodiments exemplified herein take advantage of the on-the-fly image refresh rate adaptation to synchronize video outputs from different cards while avoiding manipulation of the internal memory registers of the video cards.

Figure 1:
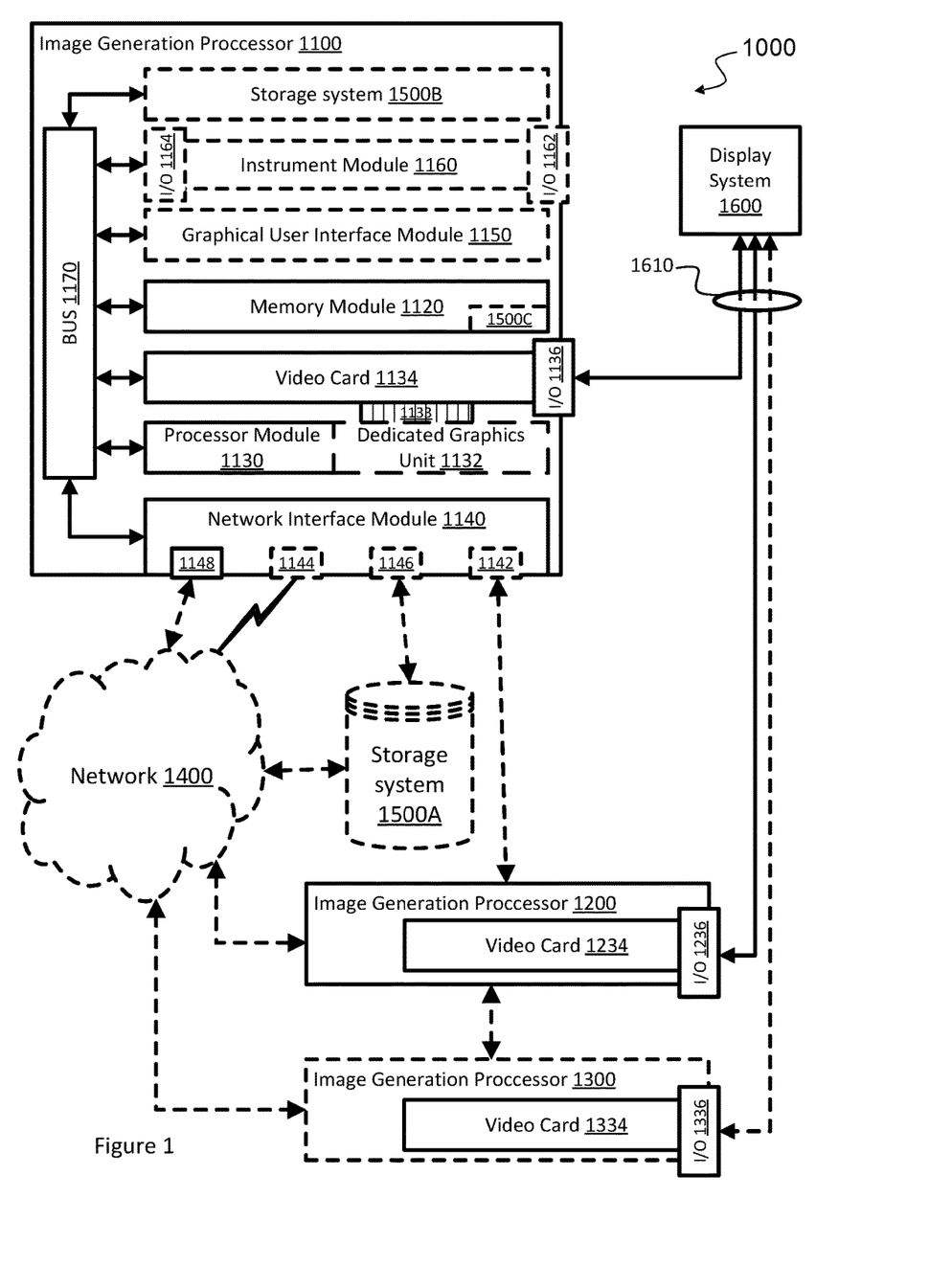
FIG. 1 is a modular representation of an exemplary computer system in accordance with the teachings of the present invention.

Reference is now made to the drawings in which FIG. 1 shows a logical modular representation of an exemplary interactive computer simulation system 1000 performing one or more interactive computer simulations (such as interactive flight, marine and/or land vehicle, medical, crowd behavior simulations, etc.), in accordance with the teachings of the present invention. The interactive computer simulation system 1000 comprises an image generation processor 1100, which may be involved in one or more of the interactive computer simulations from an interactive computer simulation station.

In the depicted example of FIG. 1, the interactive computer simulation system 1000 shows an image generation processor 1200 and an optional image generation processor 1300, which may communicate directly or indirectly (e.g., through the network 1400) with the image generation processor 1100. The image generation processors 1200, 1300 may be associated to a single interactive computer simulation station where the image generation processors 1100 and 1200 and optionally 1300 may cooperate with one another to process composite images for a display system 1600 for the user(s) in a single interactive computer simulation station. The single interactive computer simulation station may be involved in an interactive computer simulation that also involve other simulation stations(s) (not shown) co-located therewith or remote therefrom.

In the depicted example of FIG. 1, the image generation processor 1100 comprises a memory module 1120, a processor module 1130, a video card 1134 and a network interface module 1140. The video card 1134 is shown with an I/O port 1136 that outputs images to the display system 1600 at a given refresh rate. In the depicted example of FIG. 1, the image generation processor 1200 and optionally 1300 each comprise a video card 1234 (I/O 1236) and optionally 1334 (I/O 1336). The I/O port 1236 and optionally the I/O port 1336 output images to the display system 1600 at their own given refresh rate. Alternatively or in addition, the image generator 1100 may comprise a second video card (not shown), which would also output images to the display system 1600 at a given refresh rate. A logical refresh rate measurement point 1610 is depicted on FIG. 1. It should emphasize that no synchronization hardware is required between the I/O 1136, 1236 and optionally 1336 and the display system 1600. The logical point 1610 simply serves to illustrate that, at such logical point 1610, the refresh rates of the different signals provided to the display system 1600 are being synchronized in accordance with the teachings of the present invention. For the sake of clarity, the second video card 1234 is depicted in the image generator processor 1200, but the skilled person will understand that the I/O 1136, 1236 and/or 1336 may be provided from different video cards in the image generation processor 1100 using teachings presented herein.

The display system 1600 may be composed of one or more flat panels, but could also be composed of a single flat or curved screen visible from an expected trainee's position in the interactive computer simulation station. For instance, the simulation station may comprise one or more mounted projectors for projecting images on a curved refracting screen. The curved refracting screen may be located far enough from the user of the interactive computer program to provide a collimated display. Alternatively, the curved refracting screen may provide a non-collimated display. Skilled person will readily understand the teachings presented herein are applicable in a variety of contexts not limited to the previously mentioned examples (e.g., rear projector on translucent screen, front projector on regular screen, etc.)

The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator), which requires extensive image generation capabilities (i.e., quality and throughput) to maintain expected realism of such immersive simulation (e.g., between 5 and 60 or even 120 images rendered per seconds or maximum between 8.3 ms and 200 ms for each rendered image). In some embodiments, each of the image generation processors 1100, 1200, 1300 comprise a processor module having a dedicated graphics processing unit similar to the dedicated graphics processing unit 1132. The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the image generation processor 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processor module 1130, memory module 1120 and network interface module 1140 usable in the context of the present invention will be readily apparent to persons skilled in the art.

A bus 1170 is depicted as an example of means for exchanging data between the different modules of the image generation processor 1100. The present invention is not affected by the way the different modules exchange information between them. For instance, the memory module 1120 and the processor module 1130 could be connected by a parallel bus, but could also be connected by a serial connection or involve an intermediate module (not shown) without affecting the teachings of the present invention.

Likewise, even though explicit mentions of the memory module 1120 and/or the processor module 1130 are not made throughout the description of the various embodiments, persons skilled in the art will readily recognize that such modules are used in conjunction with other modules of the image generation processor 1100 to perform routine as well as innovative steps related to the present invention.

In some embodiments, the image generation processor 1100 may also comprise a Graphical User Interface (GUI) module 1150.

The interactive computer simulation system 1000 comprises a storage system 1500 that comprises data related to a shared computer generated environment and that may further log dynamic data while the interactive computer simulation is performed. FIG. 1 shows examples of the storage system 1500 as a distinct database system 1500A, a distinct module 1500B of the image generation processor 1100 or a sub-module 1500C of the memory module 1120 of the image generation processor 1100. The storage system 1500 may also comprise storage modules (not shown) on the simulation stations 1200, 1300. The storage system 1500 may be distributed over different systems A, B, C and/or the simulations stations 1100, 1200, 1300 or may be in a single system. The storage system 1500 may comprise one or more logical or physical as well as local or remote hard disk drive (HDD) (or an array thereof). The storage system 1500 may further comprise a local or remote database made accessible to the computer system 1100 by a standardized or proprietary interface or via the network interface module 1140.

The variants of storage system 1500 usable in the context of the present invention will be readily apparent to persons skilled in the art.

An Instructor Operating Station (IOS) (not shown) may be provided for allowing various management tasks to be performed in the interactive computer simulation system 1000. The tasks associated with the IOS allow for control and/or monitoring of one or more ongoing interactive computer simulations. For instance, the IOS may be used for allowing an instructor to participate to the interactive computer simulation and possibly additional interactive computer simulation(s). In some embodiments, the IOS may be provided by the image generation processor 1100. In other embodiments, the IOS may be co-located with the image generation processor 1100 (e.g., within the same room or simulation enclosure) or remote therefrom (e.g., in different rooms or in different locations). Skilled persons will understand the many instances of the IOS may be concurrently provided in the interactive computer simulation system 1000. The IOS may provide a computer simulation management interface, which may be displayed on a dedicated IOS display module. The IOS could be located in close proximity with the image generation processor 1100, but may also be provided outside of the image generation processor 1100, in communication therewith.

The IOS display module may comprise one or more display screens such as a wired or wireless flat screen, a wired or wireless touch-sensitive display, a tablet computer, a portable computer or a smart phone. When multiple image generation processor 1100, 1200 and/or 1300 are present in the computer system 1000, the IOS may present different views of the computer program management interface (e.g., to manage different aspects therewith) or they may all present the same view thereof. The computer program management interface may be permanently shown on a first of the screens of the IOS display module 1610 while a second of the screen of the IOS display module shows a view of the interactive computer simulation (i.e., adapted view considering the second screen from images displayed through the GUI module 1150). The computer program management interface may also be triggered on the IOS, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the simulation computing device. A virtualized IOS (not shown) may also be provided to the user on the GUI module 1150 (e.g., on a main screen, on a secondary screen or a dedicated screen thereof). In some embodiments, a Brief and Debrief System (BDS) may also be provided. The BDS may be seen as a version of the IOS used during playback of recorded data only.

In certain embodiments, the IOS may be used, e.g., by the instructor in order to fulfill certain objectives of a particular simulation or training scenario, to insert or modify a visual element (e.g., add a target aircraft, change the aircraft from one type to another (e.g., different manufacturer or different allegiance), etc.) and/or to modify the behavior of a visual element (e.g., modify the direction of an aircraft, modify armament status of an aircraft, etc.). One or more of the visual elements displayed through the GUI module 1150 may represent other simulated elements (e.g., a simulated aircraft controlled from the simulation station 1200). In addition, or alternatively, one or more of the visual elements displayed through the GUI module 1150 may follow a predefined behavioral pattern (e.g., controlled using artificial intelligence), in line with objectives of a particular simulation or training scenario.

The tangible instrument provided by the instrument modules 1160, 1260 and/or 1360 are tightly related to the element being simulated. In the example of the simulated aircraft system, for instance in relation to an exemplary flight simulator embodiment, the instrument module 1160 may comprise a control yoke and/or side stick, rudder pedals, a throttle, a flap switch, a transponder, a landing gear lever, a parking brake switch, aircraft instruments (air speed indicator, attitude indicator, altimeter, turn coordinator, vertical speed indicator, heading indicator, . . . ), etc. Depending on the type of simulation (e.g., level of immersivity), the tangible instruments may be more or less realistic compared to those that would be available in an actual aircraft. For instance, the tangible instrument provided by the modules 1160, 1260 and/or 1360 may replicate an actual aircraft cockpit where actual instruments found in the actual aircraft or physical interfaces having similar physical characteristics are provided to the user (or trainee). As previously described, the actions that the user or trainee takes with one or more of the tangible instruments provided via the instrument module(s) 1160, 1260 and/or 1360 (modifying lever positions, activating/deactivating switches, etc.) allow the user or trainee to control the virtual simulated element in the interactive computer simulation. In the context of an immersive simulation being performed in the interactive computer simulation system 1000, the instrument module 1160, 1260 and/or 1360 would typically support a replicate of an actual instrument panel found in the actual system being the subject of the immersive simulation. In such an immersive simulation, the dedicated graphics processing unit 1132 would also typically be required. While the present invention is applicable to immersive simulations (e.g., flight simulators certified for commercial pilot training and/or military pilot training), skilled persons will readily recognize and be able to apply its teachings to other types of interactive computer simulations.

In some embodiment, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules such as the ones depicted for the image generation processor 1100. The external input/output (I/O) module 1162 of the instrument module 1160, 1260 and/or 1360 may connect one or more external tangible instruments (not shown) therethrough. The external I/O module 1162 may be required, for instance, for interfacing the interactive computer simulation system 1000 with one or more tangible instrument identical to an Original Equipment Manufacturer (OEM) part that cannot be integrated into the image generation processor 1100 and/or the simulation station(s) 1200, 1300 (e.g., a tangible instrument exactly as the one that would be found in the actual system subject of the interactive simulation). The internal input/output (I/O) module 1164 of the instrument module 1160, 1260 and/or 1360 may connect one or more tangible instruments integrated with the instrument module 1160, 1260 and/or 1360. The I/O 1164 may comprise necessary interface(s) to exchange data, set data or get data from such integrated tangible instruments. The internal I/O module 1164 may be required, for instance, for interfacing the interactive computer simulation system 1000 with one or more integrated tangible instrument identical to an Original Equipment Manufacturer (OEM) part (e.g., a tangible instrument exactly as the one that would be found in the actual system subject of the interactive simulation). The I/O 1164 may comprise necessary interface(s) to exchange data, set data or get data from such integrated tangible instruments.

The instrument module 1160 may comprise one or more physical module that may further be interconnected to provide a given configuration of the interactive computer program. As can be readily understood, instruments of the instrument module 1160 are expected to be manipulated by the user of the interactive computer simulation to input commands thereto.

The instrument module 1160 may yet also comprise a mechanical instrument actuator (not shown) providing one or more mechanical assemblies for physically moving one or more of the tangible instruments of the instrument module 1160 (e.g., electric motors, mechanical dampeners, gears, levers, etc.). The mechanical instrument actuator may receive one or more sets of instructions (e.g., from the processor module 1130) for causing one or more of the instruments to move in accordance with a defined input function. The mechanical instrument actuator of the instrument module 1160 may also alternatively or in addition be used for providing feedback (e.g., visual, haptic, . . . ) to the user of the interactive computer simulation through tangible and/or simulated instrument(s) (e.g., touch screens, or replicated elements of an aircraft cockpit or of an operating room). Additional feedback devices may be provided with the image generation processor 1100 or in the interactive computer simulation system 1000 (e.g., vibration of an instrument, physical movement of a seat of the user and/or physical movement of the whole system, etc.).

The simulation station associated with the image generation processor 1100 may also comprise one or more seats (not shown) or other ergonomically designed tools (not shown) to assist the user of the interactive computer simulation in getting into proper position to gain access to some or all of the instrument module 1160.

In the context of the depicted embodiments, runtime execution, real-time execution or real-time priority processing execution corresponds to operations executed during the interactive computer simulation that may have an impact on the perceived quality of the interactive computer simulation from a user perspective. An operation performed at runtime, in real-time or using real-time priority processing thus typically needs to meet certain performance constraints that may be expressed, for instance, in terms of maximum time, maximum number of frames, and/or maximum number of processing cycles. For instance, in an interactive simulation having a frame rate of 60 frames per second, it is expected that a modification performed within 5 to 10 frames will appear seamless to the user. Likewise, in an interactive simulation having a frame rate of 120 frames per second, it is expected that a modification performed within 10 to 20 frames will appear seamless to the user. Skilled persons will readily recognize that real-time processing may not actually be achievable in absolutely all circumstances in which rendering images is required. The real-time priority processing required for the purpose of the disclosed embodiments relates to perceived quality of service by the user of the interactive computer simulation, and does not require absolute real-time processing of all dynamic events, even if the user was to perceive a certain level of deterioration of quality of service that would still be considered plausible.

A simulation network (e.g., overlaid on the network 1400) may be used, at runtime (e.g., using real-time priority processing or processing priority that the user perceives as real-time), to exchange information (e.g., event-related simulation information). For instance, movements of a vehicle associated to the image generation processor 1100 and events related to interactions of a user of the image generation processor 1100 with the interactive computer generated environment may be shared through the simulation network. Likewise, simulation-wide events (e.g., related to persistent modifications to the interactive computer generated environment, lighting conditions, modified simulated weather, etc.) may be shared through the simulation network from a centralized computer system (not shown) or from one of the stations 1100, 1200, 1300. In addition, the storage module 1500 (e.g., a networked database system) accessible to all components of the interactive computer simulation system 1000 involved in the interactive computer simulation may be used to store data necessary for rendering interactive computer generated environment. In some embodiments, the storage module 1500 is only updated from the centralized computer system and the simulation computing device and stations 1100, 1200, 1300 only load data therefrom.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

Figure 2:
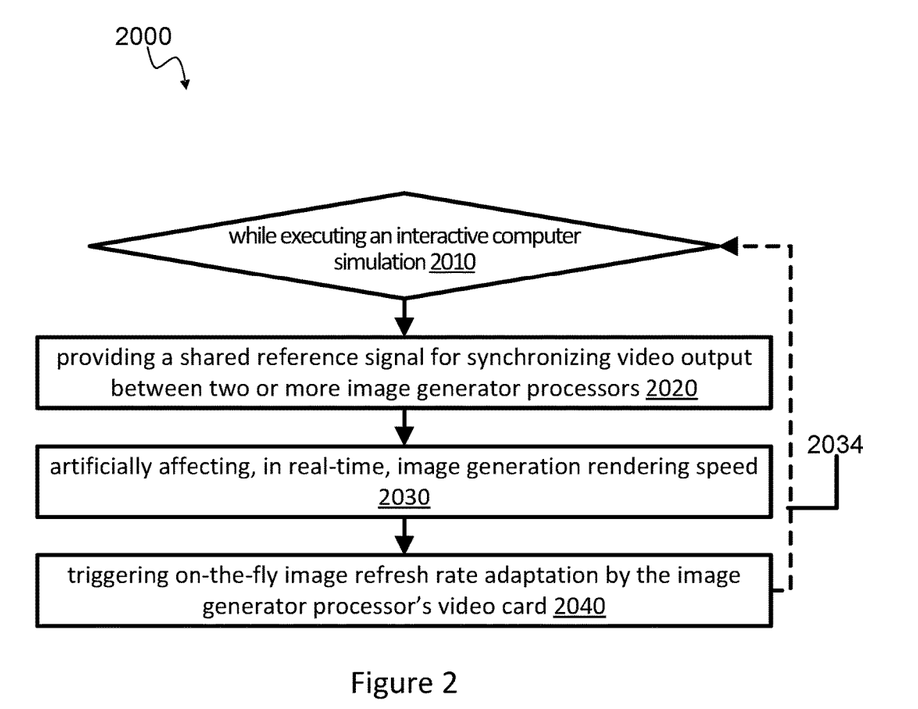
FIG. 2 is a flow chart of an exemplary method in accordance with the teachings of the present invention.

FIG. 2 depicts an exemplary method 2000 for synchronizing video output towards a single display frequency (e.g., as measurable at logical point 1610) during execution 2010 of an interactive computer simulation. In the context of the method 2000, a shared reference signal is provided 2020 for synchronizing, at the single display frequency, video output between two or more image generator processors (e.g., 1100, 1200, 1300) each driving at least one independent video card (e.g., 1134, 1234, 1334).

For the sake of the description of the exemplary method 2000, reference will be made to the image generator processors 1100 and 1200 and the video cards 1134 and 1234. Skilled persons will readily recognize that more than two (2) image generator processors and independent video cards can be used in relation to the teachings of the present invention.

An Ethernet-based synchronization protocol may be used to ensure that the different image generator processors 1100, 1200 share a common time. Skilled persons will readily recognize that other solutions may be used to achieve the same common time with the final results that the shared reference signal is available between the image generation processors 1100, 1200.

Each of the independent video cards 1134, 1234 supports on-the-fly image refresh rate adaptation based on responsiveness from the corresponding image generator processor 1100, 1200. More precisely, the on-the-fly image refresh rate adaptation feature allows the video card 1134, 1234 to dynamically modify at runtime the refresh rate of its video output considering the rate at which images are made available for display to the video card 1134, 1234. For instance, an application that runs on the image generation processor 1100, using the processor 1130 and/or dedicated processor 1132, computes an image to be displayed by the video card 1134, e.g., using the memory module 1120 and/or memory from the video card 1134 itself. Once processing of the image is completed, the image is stored in the memory module 1120 or on the video card 1134 (e.g., written to a memory buffer of the video card accessible to the processor module 1130 or made available at a given memory location accessible to the video card 1134). The processing module 1130 "informs" the video card 1134 that the image is ready by issuing a specific instruction asking the video card 1134 to display the image from memory. For instance, the processor module 1130 may issue a "draw" instructions for the video card 1134. In some embodiments, two distinct rendering buffers are made available between the processor module 1130 and the video card 1134 and a "swap rendering buffer" instruction from the processor module informs the video card 1134 that the image is ready in the corresponding rendering buffer.

The method 2000 also comprises, at each one of the image generator processors 1100, 1200, artificially affecting 2030, in real-time, image generation rendering speed during a next frame generation processing to trigger 2040 the on-the-fly image refresh rate adaptation by the one image generator processor's video card. The purpose of 2030 is to proactively schedule refresh of an image corresponding to the next frame by the video card 1134, 1234 because the trigger 2040 is predictable to the processing module 1130. Because scheduling is actively performed, it becomes possible to align the refresh of the image to the shared reference signal while avoiding manipulation of video card's memory registers by the image generator processor 1100, 1200. The same process 2010-2040 is performed (2034) for each image by processed.

In some embodiments, artificially affecting 2020, in real-time, image generation rendering speed is performed by programmatically mimicking, in real-time, image generation rendering lag during the next frame generation processing. In doing so, the image generation processor 1100 appears to the video card 1134 as being too slow, which will cause the video card 1134 to reduce the refresh rate of its output 1136. In some embodiments, alternatively or in addition, artificially affecting 2020, in real-time, image generation rendering speed is performed by programmatically mimicking, in real-time, image generation rendering hastening during the next frame generation processing. In doing so, the image generation processor 1100 appears to the video card 1134 as being fast enough to sustain a higher refresh rate, which will cause the video card 1134 to increase the refresh rate of its output 1136, provided that the video card 1134 can support such faster refresh rate.

In some embodiments, one of the different image generation processors 1100, 1200 is designated as a master image generator processor while the other(s) is designated as slave(s) image generator processor. The manner in which the master is designated is not of particular relevance in the context of the embodiments depicted herein.

When the one image generator processor is a master image generator processor, artificially affecting 2020, in real-time, image generation rendering speed may involve scheduling the next frame generation processing by a predetermined target timer linked to the shared reference signal while avoiding manipulation of the video card's memory registers by the master image generator processor.

When the one image generator processor is a slave image generator processor and unless the shared reference signal is aligned to a local slave signal, artificially affecting 2020, in real-time, image generation rendering speed may optionally involve scheduling the next frame generation processing by varying a mimicked rendering timer in real-time during a next slave frame processing to trigger 2030 the on-the-fly image refresh rate adaptation by the slave image generator processor's video card. the purpose is to reduce a time distance between the shared reference and the local slave signal, thereby improving synchronicity of an image corresponding to the next slave frame and an image corresponding to another next frame from another of the two or more image generator processors while avoiding manipulation of the video card's memory registers by the slave image generator processor.

When master and slave(s) are defined, the method 2000 may further comprise sending, from the slave image generator processor towards a reference signal generator (e.g., the master, one of the slave(s) or another network node (not shown)), an indication of the time distance between the slave local signal and the shared reference signal. The indication may optionally comprise the time distance between the shared reference and the local slave reference signal. In addition or alternatively, the reference signal generator may be provided by a master image generator processor from the two or more image generator processors. The method 2000 may also further comprise updating the shared reference signal by adjusting the predetermined target timer at the reference signal generator considering a plurality of received indications comprising the received indication of the time distance between the slave local signal and the shared reference signal. Adjusting the predetermined target timer may then optionally be performed by subtracting a minimum value from a plurality of received time distances from the plurality of received indications.

When the one image generator processor is the slave image generator processor and when the shared reference signal is aligned with the local slave reference signal, the method 2000 may then comprise processing the next frame without modifying the mimicked rendering timer.

In some embodiments, artificially affecting 2020, in real-time, image generation rendering speed during the next frame generation processing may be performed by, when the one image generator processor is a slave image generator processor and when the shared reference signal is delayed compared to a local slave reference signal, increasing a mimicked rendering lag in real-time during a next slave frame processing to trigger 2030 the on-the-fly image refresh rate adaptation by the slave image generator processor's video card for reducing a time distance between the shared reference and the local slave reference signal, thereby improving synchronicity of an image corresponding to the next slave frame and the image corresponding to the next master frame.

In some embodiments, artificially affecting 2020, in real-time, image generation rendering speed during the next frame generation processing is performed by, when the one image generator processor is the slave image generator processor and when the shared reference signal is in advance compared to the local slave reference signal, decreasing the mimicked rendering lag in real-time during the next slave frame processing for reducing the time distance between the shared reference signal and the local slave reference signal, thereby improving the synchronicity of the image corresponding to the next slave frame and the image corresponding to the next master frame.

The method 2000 may then comprise, independently from each of the two or more image generator processors 1100, 1200, providing each of the images corresponding to each of the next frame at the single display frequency towards the display panel 1600.

Figure 3:
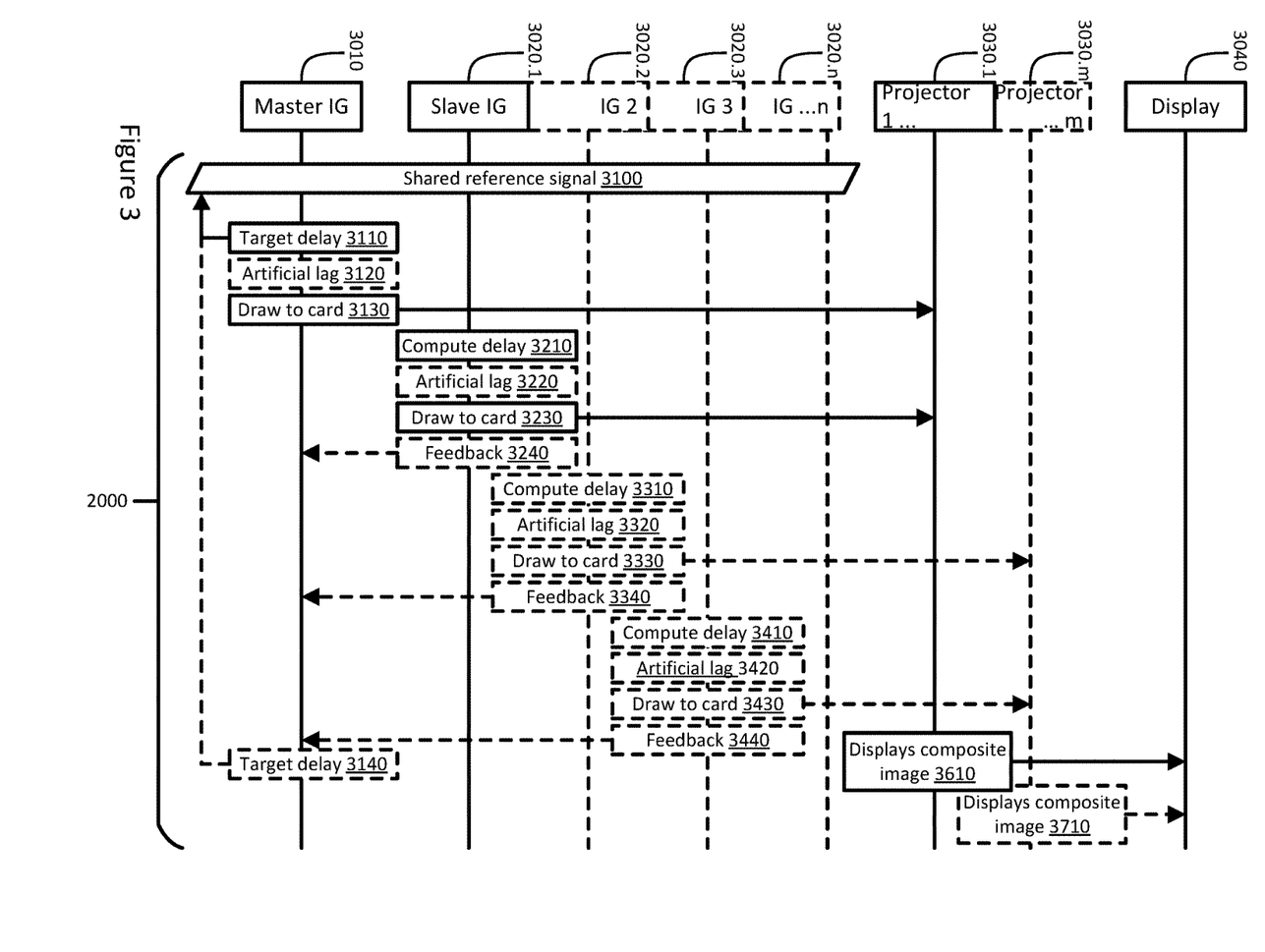
FIG. 3 is a flow and nodal operation chart of an exemplary embodiment in accordance with the teachings of the present invention.

In the example of FIG. 3, a specific example of the method 2000 is depicted. a master Image Generator (IG)

3010 shares a reference signal 3100 with slaves IGs 3020.1 . . . n, which are referred to as slaves IG 3020 unless a specific one of thereof is specifically identified. The example is therefore generalized for 1 to n slaves IG for a master IG. Typically, it is not expected to have more than a few dozens slaves in a system, but the skilled persons will understand that it is not a limit of the invention, but rather practically not useful to have too many IGs. Projectors 3030.1 . . . m are depicted as receiving one or two (e.g., 4) synchronized video signals for display on a display system 3040.

In the example of FIG. 3, the master IG 3010 sets a target delay 3110 for synchronization purposes. The target delay 3110 will affect the shared reference signal 3100 towards the slave IGs 3020. The master IG 3010 artificially affects 3120 the image generation processing before drawing 3130 the image for the video card, which then outputs the image towards a projector 3030. In some embodiments, the delay imposed by the master IG 3010 is fixed (i.e., not adjustable). The master IG 3010 may also run as efficiently as possible, leaving synchronization aspects to the slave IGs 3020, which is not the preferred solution as it actually requires every one of the slave IGs 3020 to be at least as fast as the master IG 3010.

Still, in the example of FIG. 3, each of the slave IGs 3020 compute a local delay 3210 for synchronization purposes. The local delay is set considering the shared reference signal 3100. Each of the slave IGs 3020, as needed, then artificially affects 3220 the image generation processing before drawing 3230 the image for the video card, which then outputs the image towards a projector 3030. In some embodiments, the slave IG 3220 sends feedback 3240 to the master IG 3010 in relation to the local delay computed 3210. The feedback would typically not be sent for every image, but may be sent periodically or only for certain computed delays (e.g., a threshold is crossed when the delay approaches 0 or exceeds a certain value, etc.). When the feedback is received from one or multiple of the slave IGs 3220, the master IG 3010 may modify the target delay 3140 in order to improve the synchronicity of the outputs and/or to eventually bring the target delay to a minimum value.

Finally, in the depicted example of FIG. 3, The projectors 3030 then display 3610 the composite synchronized images towards the display system 3040.

The following pseudo-code represents one exemplary embodiment in which the master IG runs with a fixed delay:

```
// Application rendering main loop
const int MaxTimingCorrectionUS = 5;
while(1)
{
  Draw( );
  // Calculate the remaining time before the next expected video vertical sync
    RemainingTimeUS = MaxFrameTimeUS - CurrentDrawTimeUS;
    SleepTimeUS = RemainingTimeUS;
    if(CurrentNode == Slave)
    {
      // All slave nodes adjust their waiting time
      // Does it need to accelerate or slow down for VSync to be synchronized?
      if (ABVsyncDeltaUS > MaxTimingCorrectionUS)
        ABVsyncDeltaUS = MaxTimingCorrectionUS;
      if (ABVsyncDeltaUS < -MaxTimingCorrectionUS)
        ABVsyncDeltaUS = -MaxTimingCorrectionUS
      SleepTimeUS = SleepTimeUS + ABVsyncDeltaUS;
    }
    Sleep (SleepTimeUS)
    SwapRenderingBuffers( );
  }
}
```

Note that the MaxTimingCorrectionUS in the preceding example can be tuned to minimize the correction effect and filter some eventual glitches.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for synchronizing video output towards a single display frequency comprising:
   providing a shared reference signal for synchronizing, at the single display frequency, video output between two or more image generator processors each driving at least one independent video card, wherein each of the independent video cards supports on-the-fly image refresh rate adaptation based on responsiveness from the corresponding image generator processor; and
   at each one of the image generator processors, artificially affecting, in real-time, image generation rendering speed during a next frame generation processing to trigger the on-the-fly image refresh rate adaptation by the one image generator processor's video card for proactively scheduling refresh of an image corresponding to the next frame by the one image generator processor's video card, thereby aligning the refresh of the image to the shared reference signal while avoiding manipulation of memory registers of the one image generator processor's video card by the one image generator processor.

2. The method for synchronizing video output of claim 1, wherein artificially affecting, in real-time, image generation rendering speed is performed by programmatically mimicking, in real-time, image generation rendering lag during the next frame generation processing.

3. The method for synchronizing video output of claim 1, wherein artificially affecting, in real-time, image generation rendering speed is performed by programmatically mimicking, in real-time, image generation rendering hastening during the next frame generation processing.

4. The method for synchronizing video output of claim 1, wherein, when the one image generator processor is a master image generator processor, artificially affecting, in real-time, image generation rendering speed involves scheduling the next frame generation processing by a predetermined target timer linked to the shared reference signal while avoiding manipulation of the video card's memory registers by the master image generator processor.

5. The method for synchronizing video output of claim 1, wherein, when the one image generator processor is a slave image generator processor and unless the shared reference signal is aligned to a local slave signal, artificially affecting, in real-time, image generation rendering speed involves scheduling the next frame generation processing by varying a mimicked rendering timer in real-time during a next slave frame processing to trigger the on-the-fly image refresh rate adaptation by the slave image generator processor's video card for reducing a time distance between the shared reference and the local slave signal, thereby improving synchronicity of an image corresponding to the next slave frame and an image corresponding to another next frame from another of the two or more image generator processors while avoiding manipulation of the video card's memory registers by the slave image generator processor.

6. The method for synchronizing video output of claim 5, further comprising sending, from the slave image generator processor towards a reference signal generator, an indication of the time distance between the slave local signal and the shared reference signal.

7. The method for synchronizing video output of claim 6, wherein the indication comprises the time distance between the shared reference and the local slave reference signal.

8. The method for synchronizing video output of claim 6, wherein the reference signal generator is provided by a master image generator processor from the two or more image generator processors.

9. The method for synchronizing video output of claim 6, further comprising updating the shared reference signal by adjusting the predetermined target timer at the reference signal generator considering a plurality of received indications comprising the received indication of the time distance between the slave local signal and the shared reference signal.

10. The method for synchronizing video output of claim 9, wherein adjusting the predetermined target timer is performed by subtracting a minimum value from a plurality of received time distances from the plurality of received indications.

11. The method for synchronizing video output of claim 5, wherein when the one image generator processor is the slave image generator processor and when the shared reference signal is aligned with the local slave reference signal, processing the next frame without modifying the mimicked rendering timer.

12. The method of claim 2 further comprising, independently from each of the two or more image generator processors, providing each of the images corresponding to each of the next frame at the single display frequency.

13. A system comprising:
a display system for displaying a synchronized composite image thereon at a single display frequency;
a plurality of independent video cards each configured for supporting on-the-fly image refresh rate adaptation based on responsiveness from a corresponding image generator process; and
a plurality of image generator processors each configured for driving one or more of the plurality of independent video cards and having access to a shared reference signal;
wherein each one of the plurality of image generator processors is configured for artificially affecting, in real-time, image generation rendering speed during a next frame generation processing to trigger the on-the-fly image refresh rate adaptation by the one image generator processor's video card for proactively scheduling refresh of an image corresponding to the next frame by the one image generator processor's video card, thereby aligning the refresh of the image to the shared reference signal while avoiding manipulation of memory registers of the one image generator processor's video card by the one image generator processor;
wherein the composite image comprises each of the images corresponding to the next frames from each one of the plurality of image generator processors.

14. The system of claim 13, wherein the one image generator processor is configured for artificially affecting, in real-time, image generation rendering speed by programmatically mimicking, in real-time, image generation rendering lag during the next frame generation processing.

15. The system of claim 13, wherein the one image generator processor is configured for artificially affecting, in real-time, image generation rendering speed by programmatically mimicking, in real-time, image generation rendering hastening during the next frame generation processing.

16. The system of claim 13, wherein the plurality of image generator processors comprise a master image generator processor and one or more slave image generator processor and, when the one image generator processor is the master image generator processor, the master image generator processor is configured for artificially affecting, in real-time, image generation rendering speed during the next frame generation processing by scheduling a next master frame generation processing by a predetermined target timer linked to the shared reference signal while avoiding manipulation of the video card's memory registers by the master image generator processor.

17. The system of claim 13, wherein the plurality of image generator processors comprise one or more slave image generator processor and, when the one image generator processor is the slave image generator processor and unless the shared reference signal is aligned to a local slave signal, the slave image generator processor is configured for artificially affecting, in real-time, image generation rendering speed during the next frame generation processing by varying a mimicked rendering timer in real-time during a next slave frame processing to trigger the on-the-fly image refresh rate adaptation by the slave image generator processor's video card for reducing a time distance between the shared reference and the local slave signal, thereby improving synchronicity of an image corresponding to the next slave frame and an image corresponding to another next frame from another of the plurality of image generator processors while avoiding manipulation of the video card's memory registers by the slave image generator processor.

18. The system of claim 17, wherein the slave image generator processor is further configured for sending, towards a reference signal generator, an indication of the time distance between the slave local signal and the shared reference signal.

19. The system of claim 18, wherein the indication comprises the time distance between the shared reference and the local slave reference signal.

20. The system of claim 18, wherein the reference signal generator is configured to update the shared reference signal by adjusting the predetermined target timer considering a plurality of received indications comprising the received indication of the time distance between the slave local signal and the shared reference signal.

* * * * *